United States Patent
Stephenson et al.

(10) Patent No.: US 6,649,116 B2
(45) Date of Patent: *Nov. 18, 2003

(54) PROCESS AND APPARATUS FOR FORMING A THIN-WALLED ELASTOMERIC ARTICLE

(76) Inventors: Peter John Stephenson, 9 Parker St., Cambridge (GB), CB1 1JL; Timothy Martin Tickner, 20 Pound Lane, Sutton, Ely (GB), CB6 2PR ( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/125,071

(22) PCT Filed: Dec. 11, 1997

(86) PCT No.: PCT/GB97/03411
§ 371 (c)(1),
(2), (4) Date: Nov. 16, 1998

(87) PCT Pub. No.: WO98/25747
PCT Pub. Date: Jun. 18, 1998

(65) Prior Publication Data
US 2003/0197311 A1 Oct. 23, 2003

(30) Foreign Application Priority Data
Dec. 11, 1996 (GB) .............................................. 9625765

(51) Int. Cl.[7] .......................... B29C 41/08; B29C 67/00
(52) U.S. Cl. ...................... 264/439; 264/255; 264/309; 264/484; 425/174.8 E
(58) Field of Search ................................ 264/439, 309, 264/403, 484, 255; 425/174.8 E

(56) References Cited

U.S. PATENT DOCUMENTS

| | | | | |
|---|---|---|---|---|
| 1,507,686 A | * | 9/1924 | Root | 264/403 |
| 2,285,370 A | * | 6/1942 | Staelin | 264/82 |
| 2,296,513 A | * | 9/1942 | Gavatin et al. | 264/81 |
| 2,393,298 A | * | 1/1946 | De Laney et al. | 264/305 |

(List continued on next page.)

FOREIGN PATENT DOCUMENTS

| | | |
|---|---|---|
| DE | 25 10 056 A1 | 9/1976 |
| DE | 42 15 914 A1 | 11/1993 |
| EP | 0 515 223 A1 | 11/1992 |
| GB | 1 278 161 A | 6/1972 |

*Primary Examiner*—Stefan Staicovici
(74) *Attorney, Agent, or Firm*—Rankin, Hill, Porter & Clark LLP

(57) ABSTRACT

A process for making thin-walled elastomeric articles. The process includes the steps of electrostatically spraying charged particles of an elastomeric composition into a chamber containing a rigid shaped former having an earthed conductive surface whereby the charged particles of the composition are attracted to the conductive surface of the former to form a coating of the composition thereon, consolidating the coating to produce the thin-walled article on the former, and stripping the article from the shaped former. The process according to the present invention can be used to produce condoms, surgical gloves, and other thin-walled articles having a thickness typically in the range of 20 to 200 microns, and more preferably 40 to 100 microns. Using the invention, it is possible to make thin-walled articles with a uniform thickness, even when the shape of the article is quite complex.

13 Claims, 1 Drawing Sheet

U.S. PATENT DOCUMENTS

Figure 1:
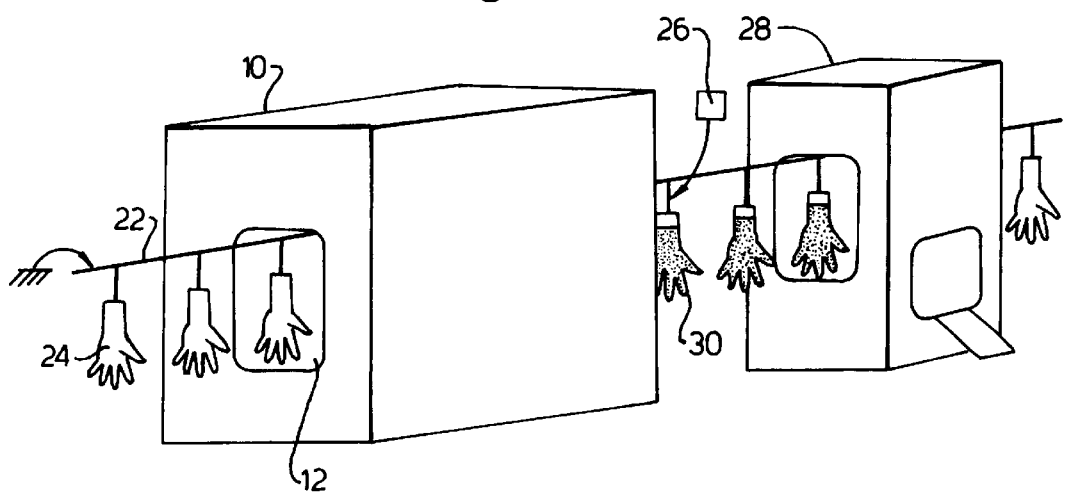
Figure 2:
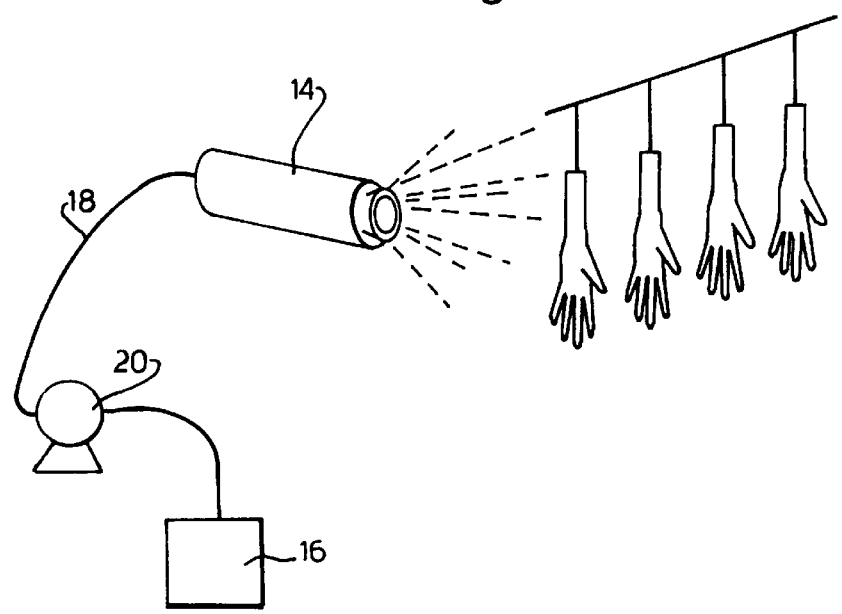

| | | | | |
|---|---|---|---|---|
| 2,551,035 A | * | 5/1951 | Miller | 204/165 |
| 3,127,456 A | * | 3/1964 | Wahl | 264/439 |
| 3,613,172 A | | 10/1971 | Giambrone | |
| 3,635,401 A | * | 1/1972 | Bromley et al. | 239/15 |
| 3,698,847 A | | 10/1972 | Goodridge | |
| 3,930,061 A | * | 12/1975 | Scharfenberger | 427/483 |
| 4,163,031 A | * | 7/1979 | Hannon et al. | 525/5 |
| 4,205,028 A | | 5/1980 | Brueggemann et al. | |
| 4,329,312 A | | 5/1982 | Ganz | |
| 4,952,293 A | * | 8/1990 | Sypula et al. | 204/479 |
| 5,095,849 A | | 3/1992 | Cutler | |
| 5,252,657 A | * | 10/1993 | Frankel et al. | 524/460 |
| 5,370,831 A | * | 12/1994 | Blair et al. | 264/460 |
| 5,380,478 A | * | 1/1995 | East | 264/225 |

* cited by examiner

PROCESS AND APPARATUS FOR FORMING A THIN-WALLED ELASTOMERIC ARTICLE

This invention relates to a process and apparatus for making thin-walled elastomeric articles.

Conventional processes for making thin-walled rubber articles, such as gloves, involve dipping a shaped former into a rubber latex, or other suitable dipping medium, to coat the former with the latex, or other medium, and curing or drying the rubber latex on the former to produce a thin-walled article, then stripping the finished article from the former. This so-called dipping process has become highly developed so that it is now possible reliably to produce very thin-walled articles such as condoms and surgeons' gloves of extremely high quality. There have been proposals to make thin-walled elastomeric articles by other methods, such as by spraying the rubber latex (or the like) on to the former (instead of dipping) but it has not proved possible to produce such high quality products reliably in these ways and these processes are rarely used.

It is known to form a protective coating on a surface by electrostatic deposition of a coating composition thereon, and this process has been extremely successful, for example, in painting irregularly shaped objects. In U.S. Pat. No. 3,698,847, the electrostatic deposition process is unusually used to form a generally non-elastomeric hollow article by electrostatically depositing a synthetic thermoplastic resin on a collapsible former, and then withdrawing the collapsed former through a hole in the wall of the self-supporting hollow article so formed. The process is described for use for making Christmas tree ornaments.

Certain elastomeric thin-walled articles such as (but not exclusively) condoms and surgeons' gloves, have to be of extremely high quality in order to be acceptable. For example, they must be essentially pore-free so as to provide reliable protection to the user. They must also have an adequate strength so as not to tear or otherwise disintegrate in use. They must also be thin-walled, and often of a wall thickness of less than 200 $\mu$m, or even below 100 $\mu$m. As stated above, the dipping process has been considerably refined over a long period of use to overcome or minimise various problems, so that such products can now be reliably and consistently produced economically and in an automated fashion, in this way.

We have now found, however, that it is possible to make thin-walled elastomeric articles reliably and without certain of the disadvantages of the well-established dipping process, by another process. In particular, we have found that such articles can be made by a process involving electrostatic deposition.

According to the present invention, there is provided a process for forming a thin-walled article, which process comprises electrostatically spraying charged particles of an elastomeric composition into a chamber containing a rigid shaped former having an earthed conductive surface whereby the charged particles of the composition are attracted to the conductive surface of the former to form a coating of the composition thereon; consolidating the coating to produce the thin-walled article on the former; and stripping the article from the shaped former.

The invention also includes apparatus for forming a thin-walled article, comprising a chamber containing a rigid shaped former having an earthed conductive surface, means for electrostatically spraying charged particles of an elastomer composition within the chamber wherein the particles can be attracted to the conductive surface and can form a coating thereon, and stripping means for stripping the thin-walled article from the shaped former after the coating has been consolidated on the former.

The provision of a satisfactory alternative to the dipping process is a surprising achievement, as is the possibility of making highly satisfactory elastomeric condoms and gloves, for example, by this technique having regard to the severity of the requirements for the production of commercially acceptable products.

In the process of the invention, the consolidation step is important. The degree of consolidation will be sufficient to ensure that the thin walled article can be stripped from the former as an integral article, without damaging the structure of the article. Further details are described hereinafter.

The elastomeric composition may be any composition that is capable of being electrostatically charged when sprayed in particulate form; it may be a liquid or it may be a solid. When the sprayed particles are in the form of a liquid, then the consolidation will generally involve some kind of solidification; when the sprayed particles are in the form of a solid, then the consolidation will generally involve some kind of amalgamation of the particles into an integral mass. The particle coating may be consolidated by a variety of different techniques. For example, the composition that is sprayed into the chamber may be curable, so that the coating can be consolidated by curing. However, it is preferred that the coating can be consolidated by evaporation: for example, the composition that is sprayed may include a solvent that can be evaporated to leave a solid coating on the former.

When the composition is a solid, the coating will normally comprise a plurality of solid particles electrostatically adhered to the surface of the former. These particles may be amalgamated to form the thin-walled article by, for example, heating them to cause them to soften or melt and coalesce, and then cooling the coalesced coating.

The consolidation may occur naturally, without any specific treatment. However, it is usually desirable or essential to speed up the consolidation process with some form of treatment. We prefer to carry out the consolidation using heat treatment. Although the heat treatment may be carried out in an oven, it is especially preferred that the heat treatment is carried out by inducing electrical currents in the former.

When the composition is a liquid, it can be atomised to form a plurality of small liquid particles, which can be electrostatically charged. The liquid form of the composition may include an organic or aqueous solvent, or it may comprise solid particles dispersed or dissolved in a liquid. Suitable liquid compositions comprise film-forming elastomeric materials, and include: polyurethanes (solvent and water based solutions and emulsions); fluoroelastomers; triblock copolymer rubbers (SBS, SIS, SEBS), styrene-butadiene rubber latex (SBR); acrylonitrile-butadiene rubber latex (NBR); carboxylated-SBR, carboxylated-NBR, and other carboxylated rubber latices; styrene-vinylpyridine-butadiene terpolymer latex; natural rubber latex (NR); poly-chloroprene rubber latex (CR); and butyl rubber latex (isobutene-isoprene rubber).

The preferred elastomeric compositions are those containing thermoplastic elastomeric polyurethanes, more preferably aqueous dispersions of thermoplastic elastomeric polyurethanes, and most preferably aqueous dispersions of thermoplastic elastomeric polyurethanes containing a cosolvent such as methyl isobutyl ketone or the like.

When the composition is a solid, it is almost invariably provided in the form of solid powder.

The particles of the composition can be sprayed using a conventional electrostatic spray gun. This can impart an electrostatic charge to the particles of the composition. When the composition is a liquid, the spray gun may be adapted to atomize the liquid to produce a plurality of small particles. When the composition is a solid, the spray gun is usually provided with the solid particles in powder form. Typically, the particle size of the sprayed composition is dependent upon the parameters of the spraying apparatus which, in turn, will be dependent upon the composition being sprayed.

The former may be rotated or otherwise moved while it is being coated, in order to help provide a uniform coating.

In a preferred aspect of the invention, the elastomeric composition, in the form of a solution or dispersion in water or organic solvent, is electrostatically sprayed by means of a rotary atomiser. This has the advantage of producing very fine particles which, when consolidated on the rigid former, are capable of producing a high quality thin-walled film with good surface finish and freedom from holes. In a particularly preferred aspect, the elastomeric composition is dispersed in water containing a small quantity of a solvent for the composition. Rotary atomisers are known in the art and no further description thereof will therefore be given herein.

In some circumstances it is desirable to respray the former with more particles of the composition, or with particles of another composition, after the solidification step, but before the stripping step. This may be necessary in order to produce an article of a particular thickness. It is possible to change the composition that is sprayed during some, or all, of the spraying and consolidation steps; this makes possible the production of articles having varying properties and colours. The second (and any further) spraying can be made with an elastomeric or non-elastomeric composition, as desired.

The size of the electrostatic charge imparted to the particles of the composition, the solids content of the composition, and the position and speed of passage (if any) of the former in the spray chamber are just some of the parameters in electrostatic spraying that can be varied in order to alter the thickness of the thin-walled article formed on the former.

The preferred method of consolidating the coating is by a heat treatment. Thus, it is preferred that the apparatus according to the invention includes a heating means. In one embodiment, the heating means comprises an oven, which is used at a temperature sufficient to consolidate the coating on the former. In this embodiment, the former can be retained in the oven for a time sufficient to consolidate the coating.

In another embodiment, the consolidating means may comprise a device for inducing an electrical current in the former, whereby the former can be heated to a temperature at which the coating can be consolidated. This embodiment has the advantage that it is not necessary to provide a separate oven for the consolidation.

The former is substantially rigid and may be solid or hollow. It is possible for the former to comprise a non-conductive material having a conductive coating. However, we prefer that substantially all the former is of a conductive material. Most preferably, the former comprises a conductive metal, such as stainless steel or aluminium. Alternatively glass may be used, with reduced efficiency, in the presence of moisture.

Preferably, the apparatus includes a conveyor to carry the former into and through the spray chamber, and from the spray chamber to the stripping means. If an oven or other consolidation means is provided, then the conveyor may carry the former to the oven or other consolidation means, before carrying it to the stripping means. It is desirable to provide a plurality of separate formers on the conveyor.

It is an important feature of the method and apparatus according to the invention that the thin-walled article can be stripped from the shaped former after consolidation of the coating. For this reason, the composition and the former need to be made of materials such that the coating does not adhere to the former after consolidation. This is different from conventional electrostatic spraying processes, where the sprayed coating is intended to adhere to the article being sprayed. However, it is important to bear in mind that when the article is formed using multiple spraying and consolidation steps, only the innermost layer of the article needs to be formed of a material that can be stripped from the former.

The present invention can be used to provide high quality thin-walled articles of selected thickness. The thickness is typically in the range 20 to 200, preferably 40 to 100, microns. Using the invention, it is possible to make thin-walled articles with a uniform thickness, even when the shape of the article is quite complex.

The present invention has the advantage that there is no dripping of the material coated on the former, due to the attraction between the material and the former. Furthermore, any necessary additives may be added at the spray head, so there is no reduced potlife.

It is often desirable to change the composition, for example to alter the colour or fragrance. The invention makes possible a quick and clean changeover from one composition to another, with a minimal amount of wastage.

Moreover, defects caused by particulates in the dipping tank are eliminated with electrostatic spraying, due to the bulk material not being exposed to external objects, eg formers, and being stored in covered containers.

The invention can be used for the production of a wide variety of thin-walled articles including primarily condoms and gloves, but also other contraceptive devices, medical device application aids (eg colonoscopy coverings), medical device covers, balloons and elastomeric bags.

Reference is now made to the accompanying drawing, in which:

FIG. 1 is an orthogonal view of part of an apparatus according to the invention; and FIG. 2 is an orthogonal view of another part of an apparatus according to the invention.

In the drawings, an apparatus for forming a thin-walled article comprises a housing 10 defining a chamber 12 therein. The housing 10 contains an electrostatic spray head 14, which is connected to a supply 16 of a liquid solidifiable composition via a pipe 18. A pump 20 is provided to pump the composition from the supply 16 to the spray head 14. The spray head 14, the pipe 18, the supply 16 and the pump 20 may be entirely conventional. The pump 20 and the supply 16 are disposed outside the chamber 12.

A conveyor 22 is provided with a plurality of shaped formers 24 thereon. Each of the shaped formers 24 has a conductive surface and is earthed via the conveyor 22. A heating means 26 is provided for each shaped former 24. The heating means 26 comprises electrical circuitry necessary to heat the former 24 by inducing electrical currents in the former 24. Heating the former serves to dry the composition thereon to produce a thin-walled article 30 having the same shape as the exterior surface of the former 24.

The conveyor 22 extends through the chamber 14 and through a stripper 28. The stripper 28 serves to strip the thin-walled article 30 from the shaped former 24.

For clarity, the spray head 14, the supply 16, the pipe 18, and the pump 20 are not shown in FIG. 1— these components are shown in FIG. 2. Also for clarity, in FIG. 2 the housing 10, the heating means 26 and the stripping means 28 are not shown.

The operation of the apparatus will now be described. The conveyor 22 conveys the formers 24 into the chamber 12. When one of the formers 24 enters the chamber 12, the pump 20 pumps the composition from the supply 20 to the spray head 14. The spray head 14 atomises the composition, and imparts an electrostatic charge to the particles formed by the atomisation; the charged particles are then sprayed into the chamber 12. It is not essential to spray the particles directly towards the former 24, because the former 24 is earthed and tends to attract the charged particles. The charged particles form a coating on the former 24.

The rate of spraying the charged particles, and the speed of the conveyor 22, can be set so that the former 24 is fully coated before it leaves the chamber 12.

After the former 24 has been coated, the heating means 26 can be activated to heat the former, and to dry the composition on the former 24. This results in the formation of the thin-walled article 30. When the composition has finished drying, the conveyor 22 conveys the former 24 to the stripper 28, where the thin-walled article 30 is stripped from the former 24.

EXAMPLE 1

A composition was prepared comprising a solution of a soft polyurethane elastomer in a solvent system of 60% v/v methyl ethyl ketone and 40% v/v tetrahydrofuran. The composition had a solids contents of 5% w/w. The soft polyurethane elastomer typically had physical properties of modulus at 300% extension of 2.4 MPa, tensile strength 60 MPa and elongation at break 500%.

The composition was coated on a round cylindrical stainless steel former using an electrostatic spraying apparatus. The apparatus was an alphaBell high-speed rotary atomizer, on a reciprocator, in a large booth containing a conveyor chain from which the stainless steel formers were suspended. All the equipment used was provided by Lactec GmbH. The composition was dried, after it had been sprayed onto the former, in an oven at 70° C.

The thin-walled article on the former was left to cool, and was then stripped from the former by hand using water. It was visually inspected for uniformity, holes and bubbles, and was assessed for thickness.

The article was of very good quality and had a thickness of approximately 34 microns.

EXAMPLE 2

A composition was prepared comprising a solution of a soft polyurethane elastomer in a solvent system of 60% v/v methyl ethyl ketone and 40% v/v tetrahydrofuran. The composition had a solids content of 5% w/w. The polyurethane elastomer was the same as in Example 1.

The composition was coated on a stainless steel former using the same electrostatic spraying apparatus that was used in Example 1. The composition was dried, after it had been sprayed on the former, in an oven at 70° C., and the former was then resprayed using the electrostatic spraying apparatus. The composition was then dried again in an oven at 70° C.

The thin-walled article formed was left to cool, and was then stripped from the former by hand using water. It was visually inspected for uniformity, holes and bubbles, and was assessed for thickness.

The article was of very good quality and had a thickness of approximately 53 microns.

EXAMPLE 3

A composition was prepared comprising a solution of a soft polyurethane elastomer in a solvent system of 60% v/v methyl ethyl ketone and 40% v/v tetrahydrofuran. The composition had a solids content of 5% w/w. The polyurethane elastomer was the same as in Example 1.

The composition was coated on a stainless steel former using the same electrostatic spraying apparatus that was used in Example 1. The composition was dried, after it had been sprayed on the former, in an oven at 70° C., and the former was then resprayed using the electrostatic spraying apparatus. The composition was then dried again, in an oven at 70° C., and the former was again resprayed using the electrostatic spraying apparatus. The composition was then dried again in an oven at 70° C.

The thin-walled article formed on the former was left to cool, and was then stripped from the former by hand using water. It was visually inspected for uniformity, holes and bubbles, and was assessed for thickness.

The article was of very good quality and had a thickness of approximately 69 microns.

EXAMPLE 4

Another thin-walled article was formed using the same procedure as in Example 3, except that there was no drying step between each spray. Thus, the composition was resprayed onto a wet surface. After three spraying steps, the composition was dried in an oven at 70° C.

The thin-walled article formed on the tube was left to cool, and was then stripped from the former by hand using water. It was visually inspected for uniformity, holes and bubbles.

The article was of very good quality and had a slight surface roughness.

EXAMPLE 5

Another thin-walled article was prepared using the method and apparatus of the present invention.

A composition was prepared comprising a dispersion of a polyurethane (polyether urethaneurea) in a solvent system of 20% v/v methyl ethyl ketone and 80% v/v water. The composition had a solids content of 24.5% w/w.

The composition was coated on an aluminium former, previously heated to 45° C. (±5° C.), using the same electrostatic apparatus that was used in Example 1. The composition was dried in an oven at 120° C.

The thin-walled article formed was then stripped from the former by hand using water. It was visually inspected for holes and bubbles, and was assessed for thickness.

The article was of very good quality and had a thickness of approximately 80 microns.

It will be appreciated that modifications may be made to the embodiments of the invention described above. For example, the heating means 26 could be replaced with an oven disposed between the chamber 12 and the stripper 28. Furthermore, it is possible to arrange several of the formers 24 in parallel, so that several formers 24 can be simultaneously coated. Another possible modification could be the use of different compositions to produce a single laminated article. This would have the advantage of producing an article with differing properties, dependent on the properties of the individual compositions.

We refer herein to the former having an earthed conductive surface. As will be plain to those skilled in the art, whilst an earthed surface is the normal procedure, the process can be carried out whether or not the surface is connected to earth, provided that there is a potential difference between the surface and the charged particles such that the particles are attracted to and become deposited on the surface. The specification and claims are to be read as covering such a mode of operation.

What is claimed is:

1. A process for forming a thin-walled article, which process comprises electrostatically spraying charged particles of an elastomeric composition consisting essentially of a dispersion of an elastomer in a dispersant, into a chamber containing a rigid shaped former having an earthed conductive surface whereby the charged particles of the composition are attracted to the conductive surface of the former to form a coating of the composition thereon; consolidating the coating to produce the thin-walled article on the former; and stripping the article from the shaped former.

2. A process according to claim 1, wherein the composition is consolidated by evaporating said dispersant to leave a residue comprising said film forming material on the former.

3. A process according to claim 2, wherein the dispersant is evaporated at room temperature, whereby the coating is consolidated at room temperature.

4. A process according to claim 1, wherein the former having said coating of the composition thereon is heated to consolidate the coating.

5. A process according to claim 1, wherein the thickness of the consolidated coating is from 20 to 200 microns.

6. A process according to claim 1, wherein the thickness of the consolidated coating is from 40 to 100 microns.

7. A process according to claim 1, wherein the thin-walled article is flexible.

8. A process according to claim 1, wherein the thin-walled article is a glove or a condom.

9. A process according to claim 1, wherein the elastomeric composition includes an elastomeric polyurethane; a fluoroelastomer; or a triblock copolymer rubber.

10. A process according to claim 1, wherein the elastomeric composition comprises a styrene-butadiene rubber latex; a carboxylated SBR latex; an acrylonitrile-butadiene rubber latex; a carboxylated acrylonitrile-butadiene rubber latex; a styrene-vinylpyridine-butadiene terpolymer latex; a natural rubber latex; a polychloroprene rubber latex; or a butyl rubber latex.

11. A process according to claim 1, wherein the elastomeric composition includes ancillary chemicals which have the capability of effecting crosslinking or curing of the elastomeric component of the composition during a heating step after deposition and consolidation of the coating while it is still on the former.

12. A process according to claim 1, wherein the rigid former is rotated during spraying.

13. A process according to claim 1, wherein after the coating has consolidated but before it has been stripped from the former, electrostatically charged particles of the same or of a different composition are sprayed into the chamber to form an additional coating on the former, and the particles being consolidated to form an additional coating.

* * * * *